United States Patent
Jun et al.

(10) Patent No.: US 8,345,208 B2
(45) Date of Patent: Jan. 1, 2013

(54) DISPLAY SUBSTRATE AND DISPLAY PANEL HAVING THE SAME

(75) Inventors: Sahng-Ik Jun, Yongin-si (KR); Yun-Jung Cho, Asan-si (KR)

(73) Assignee: Samsung Display Co., Ltd., Yongin (KR)

( * ) Notice: Subject to any disclaimer, the term of this patent is extended or adjusted under 35 U.S.C. 154(b) by 0 days.

(21) Appl. No.: 13/243,811

(22) Filed: Sep. 23, 2011

(65) Prior Publication Data

US 2012/0013838 A1  Jan. 19, 2012

Related U.S. Application Data

(63) Continuation of application No. 12/465,410, filed on May 13, 2009, now Pat. No. 8,054,434.

(30) Foreign Application Priority Data

Jul. 11, 2008 (KR) .......................... 10-2008-0067540

(51) Int. Cl.
*G02F 1/1343* (2006.01)
(52) U.S. Cl. ........................................ 349/141; 349/142
(58) Field of Classification Search ................... 349/142
See application file for complete search history.

(56) References Cited

U.S. PATENT DOCUMENTS

| 5,247,375 A * | 9/1993 | Mochizuki et al. ............. 349/84 |
| 7,177,002 B2 | 2/2007 | Matsumoto et al. |
| 7,656,486 B2 | 2/2010 | Tasaka et al. |
| 7,746,436 B2 | 6/2010 | Shin et al. |
| 7,973,864 B2 | 7/2011 | Kim |
| 8,054,434 B2 * | 11/2011 | Jun et al. ........................ 349/141 |
| 2003/0202146 A1 | 10/2003 | Takeda et al. |
| 2006/0023134 A1 | 2/2006 | Um et al. |
| 2007/0247559 A1 * | 10/2007 | Tasaka et al. ................... 349/46 |
| 2008/0079883 A1 * | 4/2008 | Yang et al. ..................... 349/142 |
| 2008/0100555 A1 * | 5/2008 | Yoon et al. ....................... 345/92 |
| 2008/0174708 A1 * | 7/2008 | Yoo et al. ......................... 349/39 |
| 2009/0195743 A1 | 8/2009 | Kim et al. |
| 2010/0123844 A1 | 5/2010 | Um et al. |

FOREIGN PATENT DOCUMENTS

| EP | 1659443 | 5/2006 |
| KR | 1020080048211 | 6/2008 |

OTHER PUBLICATIONS

European Search Report dated Aug. 18, 2009.
European Examination Report of Feb. 21, 2011 in corresponding European Patent Application No. 09 006 892.5.
Notice of Allowance issued on Aug. 17, 2011 in co-pending U.S. Appl. No. 12/465,410.

* cited by examiner

*Primary Examiner* — Michelle R. Connelly
(74) *Attorney, Agent, or Firm* — H.C. Park & Associates, PLC

(57) ABSTRACT

In a display substrate and a vertical alignment display panel having the same, the display panel includes an array substrate and an opposite substrate. A plurality of first slit portions are arranged through a pixel area of a common electrode on the array substrate, and the first slit portions extend in a slanted direction. A plurality of grooves and a plurality of protruding portions are alternately arranged at edges facing each other on the first slit portion, so that the first slit portions are patterned. A positive singular point is generated on a side surface of a protruding portion, and a negative singular point is generated between the positive singular points.

24 Claims, 13 Drawing Sheets

DISPLAY SUBSTRATE AND DISPLAY PANEL HAVING THE SAME

CROSS REFERENCE TO RELATED APPLICATION

The present application is a continuation of U.S. application Ser. No. 12/465,410 filed on May 13, 2009, and claims priority from and the benefit of Korean Patent Application No. 2008-67540, filed on Jul. 11, 2008, which is hereby incorporated by reference for all purposes as if fully set forth herein.

BACKGROUND OF THE INVENTION

1. Field of the Invention

The present invention relates to a display substrate and a display panel having the display substrate. More particularly, exemplary embodiments of the present invention relate to a display substrate used as a substrate of a vertical alignment (VA) liquid crystal display (LCD) panel and a VA LCD panel having the display substrate.

2. Discussion of the Background

Generally, a liquid crystal display (LCD) device is one of the most widely used types of flat panel display devices. An LCD device includes two display substrates having electrodes forming an electric field and a liquid crystal layer formed between the two display substrates. A voltage is applied to each of the electrodes to rearrange liquid crystal molecules, so that the transmissivity of light passing through the liquid crystal layer is controlled.

The electrodes forming an electric field are respectively formed on the display substrate. Specifically, a plurality of pixel electrodes is arranged in a line on the display substrate, and a common electrode covers the other substrate. A voltage is applied to each of the pixel electrodes to display an image on the LCD device. A switching element, which is a three-terminal device, is connected to each pixel electrode for switching a voltage applied to the pixel electrode. A gate line transmits a signal to control the switching element, and a data line transmits a voltage that is applied to the pixel electrode. The gate line and data line are formed on the display substrate.

However, an LCD device is disadvantageous in that it may have a narrow viewing angle. Various technologies have been developed to overcome this problem. For example, liquid crystal molecules may be vertically aligned with respect to two substrates, and a slit portion pattern or a protrusion pattern may be formed on a pixel electrode and a common electrode facing the pixel electrode to divide a pixel into multiple domains.

However, in the vertical alignment (VA) LCD device having slit portion patterns or protrusion patterns, afterimages and spots may be generated in the slit portion patterns or protrusion patterns. Moreover, when a screen is rubbed, spots may be generated.

SUMMARY OF THE INVENTION

The present invention provides a display substrate that may be capable of preventing afterimages and spots.

The present invention also provides a display panel having the display substrate.

Additional features of the invention will be set forth in the description which follows, and in part will be apparent from the description, or may be learned by practice of the invention.

The present invention discloses a display substrate that includes a base substrate and a transparent electrode. The base substrate includes a pixel area with a horizontal side and a vertical side. A transparent electrode is disposed in the pixel area and includes a plurality of slit portions extending in a slanted direction with respect to the horizontal side and the vertical side. A first edge of the slit portions comprises a first groove and a first protruding portion that are alternately arranged, and the first protruding portion is defined by adjacent first grooves. A second edge of the slit portions faces the first edge and includes a second protruding portion corresponding to the first groove, and a second groove corresponding to the first protruding portion. The second protruding portion and the second groove are alternately arranged.

The present invention also discloses a display panel that includes an array substrate, an opposite substrate and a liquid crystal layer. The array substrate includes a lower substrate, a switching element, a signal line and a pixel electrode. The switching element is arranged on the lower substrate. The signal line is connected to the switching element. The pixel electrode is connected to an output electrode of the switching element. The opposite substrate includes an upper substrate and a common electrode. The upper substrate has a pixel area with a horizontal side and a vertical side. The common electrode has a plurality of slit portions. The common electrode extends in a slanted direction with respect to the horizontal side and vertical side. A plurality of grooves and a plurality of protruding portions defined by the grooves are alternately arranged in edges facing each other of the first slit portion so that the first slit portions have a zigzag pattern shape defined by the groove and the protruding portion. The liquid crystal layer is arranged between the array substrate and the opposite substrate to be vertically aligned with respect to the array substrate and the opposite substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
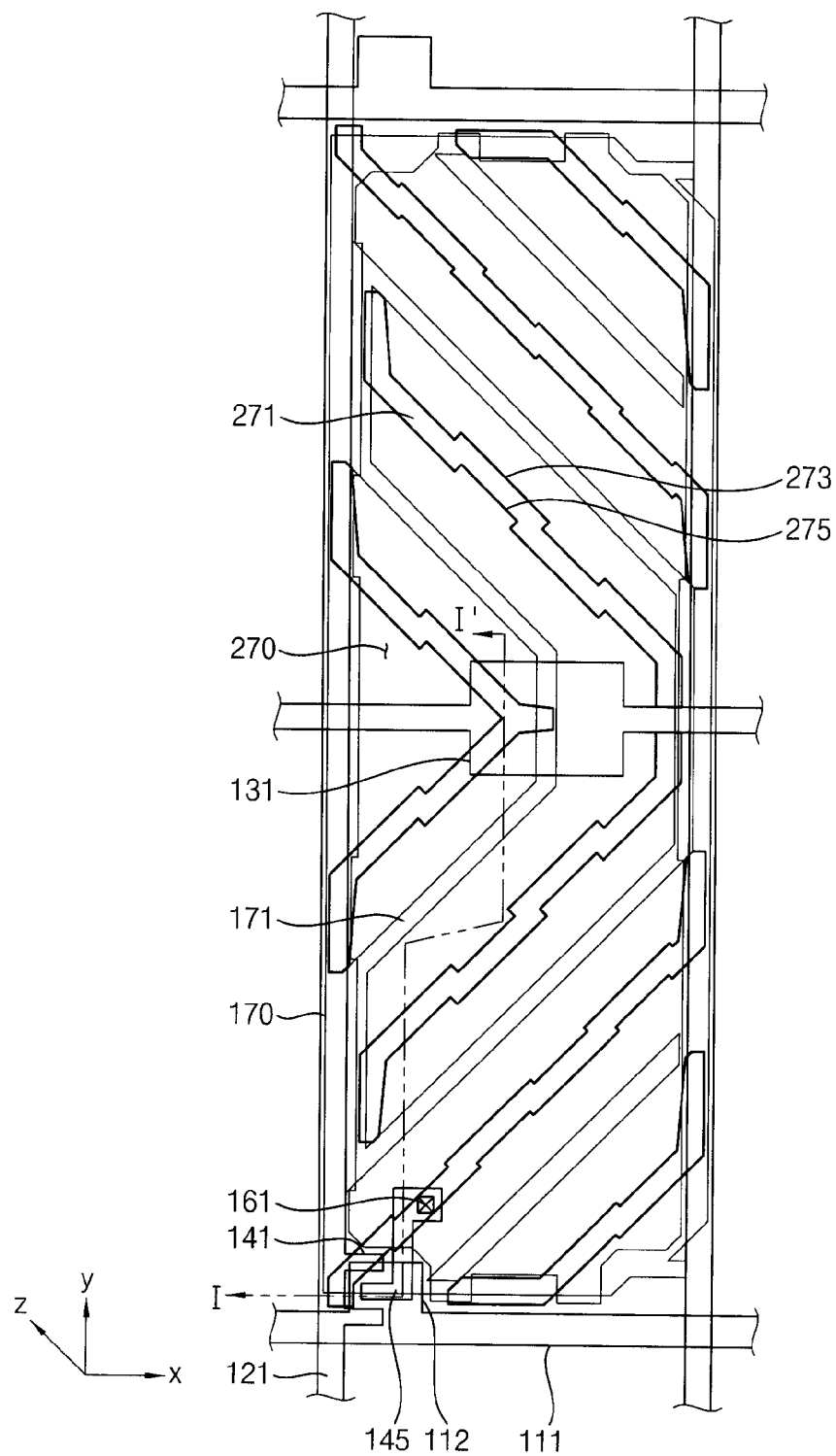
FIG. 1 is a plan view showing a display panel according to a first exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be explained in detail with reference to the accompanying drawings.

Figure 2:
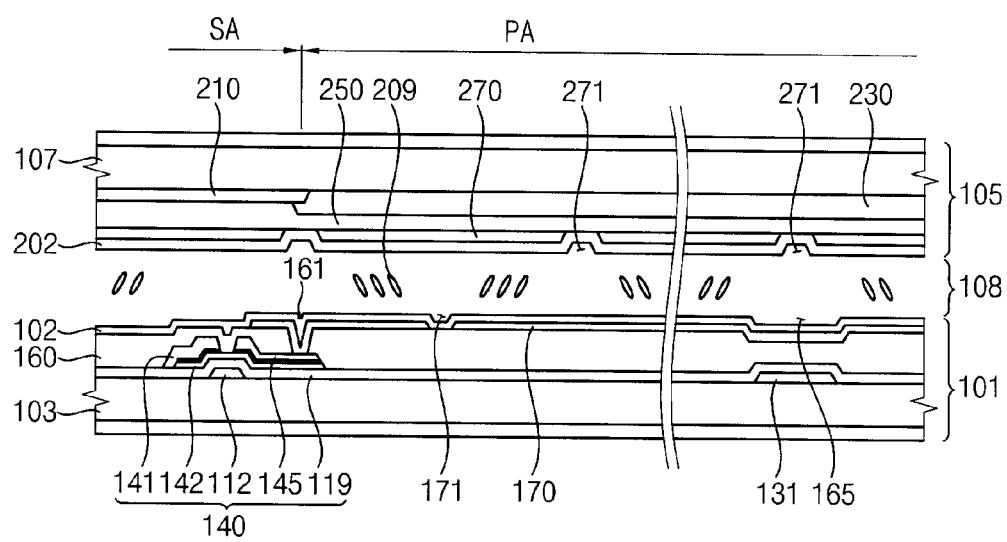
FIG. 2 is a cross-sectional view taken along line I-I' of FIG. 1.

FIG. 1 is a plan view showing a display panel according to a first exemplary embodiment of the present invention. FIG. 2 is a cross-sectional view taken along line I-I' of FIG. 1.

Referring to FIG. 1 and FIG. 2, a display panel 100 includes an array substrate 101, an opposite substrate 105, and a liquid crystal layer 108.

The opposite substrate 105 and the array substrate 101 are disposed facing each other, the liquid crystal layer 108, which includes liquid crystal molecules 209, is interposed between the opposite substrate 105 and the array substrate 101. A lower alignment layer 102 and an upper alignment layer 202, which contact the liquid crystal layer 108, are formed on the array substrate 101 and the opposite substrate 105, respectively. The liquid crystal molecules 209 are induced to be substantially perpendicular to the array substrate 101 and the opposite substrate 105 by the lower alignment layer 102 and an upper alignment layer 202 in a state in which an electric field is not applied to the liquid crystal layer 108, that is, the liquid crystal molecules 209 are aligned vertically with respect to the array substrate 101 and the opposite substrate 105. Outward sides of the opposite substrate 105 and the array substrate 101 are attached to an upper and lower polarizer, respectively.

A display substrate according to the first exemplary embodiment of the present invention, that is, the opposite substrate 105, includes an upper substrate 107, a light-blocking pattern 210 formed on the upper substrate 107, a color filter 230, an overcoating layer 250, and a common electrode 270.

The upper substrate 107 includes a pixel area PA, which transmits light, and a light-blocking area SA, which blocks light and surrounds the pixel area PA. The pixel area PA has a horizontal side and a vertical side. The pixel area PA has a substantially rectangular shape.

The color filter 230 is formed in the pixel area PA. The color filter 230 includes a red filter, a green filter, and a blue filter. Substantially identical color filters 230 are formed on the plurality of pixel areas PA arranged in a horizontal direction X, and different color filters 230 are formed on the plurality of pixel areas PA arranged in a vertical direction Y.

The light-blocking pattern 210 is formed on the light-blocking area SA to surround the red filter, the green filter, and the blue filter.

The overcoating layer 250 covers the light-blocking pattern 210 and the color filter 230.

Figure 3:
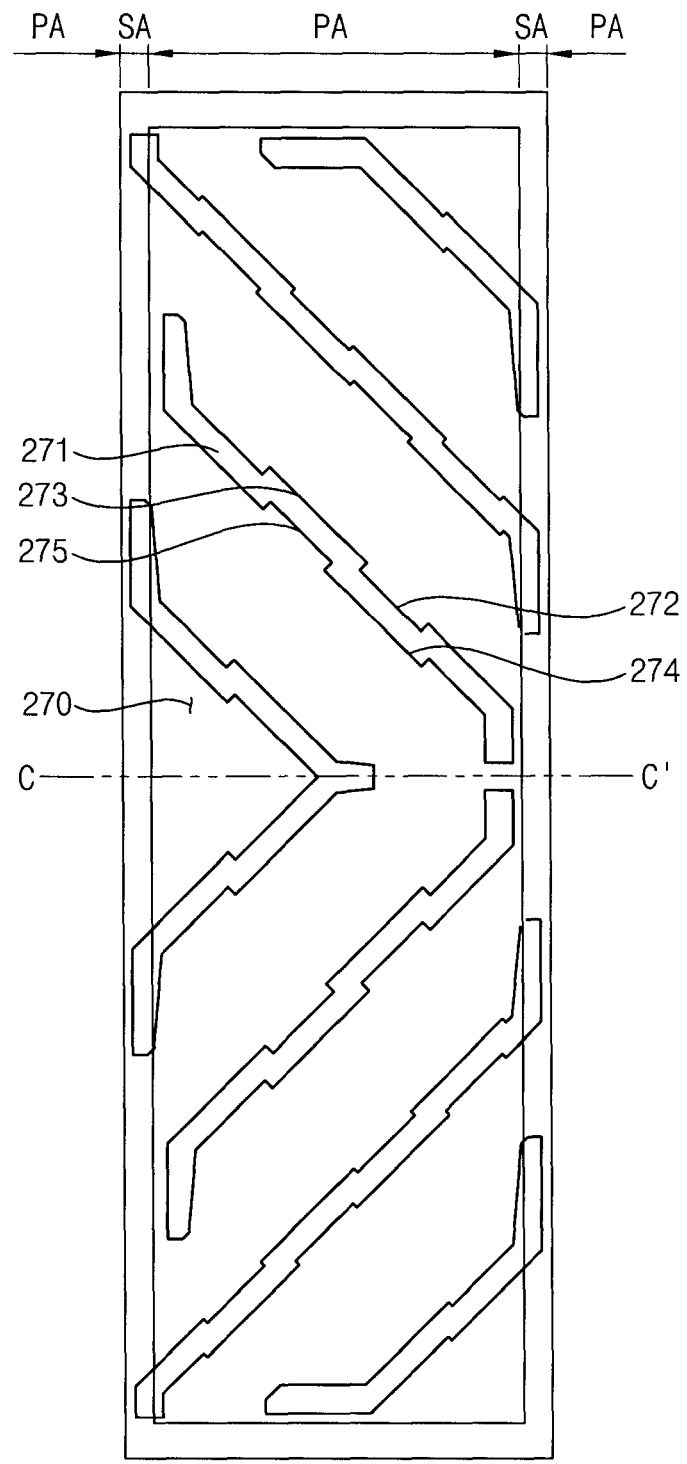
FIG. 3 is a plan view showing an opposite substrate of FIG. 2.

FIG. 3 is a plan view showing the opposite substrate 105 of FIG. 2.

Referring to FIG. 1 and FIG. 3, the common electrode 270 is formed on the overcoating layer 250. The common electrode 270 is formed from a transparent conductive material such as indium tin oxide (ITO) or indium zinc oxide (IZO). A plurality of the first slit portions 271 are formed through the common electrode 270. The first slit portions 271 may be openings formed through the common electrode 270. An opening width of the first slit portion 271 may be a few μm to a few tens of μm.

The first slit portion 271 is extended in a slanted direction Z with respect to the horizontal side and vertical side in the pixel area PA. The common electrodes 270 are spaced apart from each other. Certain slit portions among the first slit portions 271 may include bent portions bent parallel with the vertical sides. Other certain slit portions among the first slit portions 271 may include bent portions bent parallel with the vertical sides and the horizontal sides, respectively.

The first slit portion 271 is formed through the common electrode 270 to be symmetrical with respect to a center line C-C', which is the center line of the horizontal side in the pixel area PA. Accordingly, the certain first slit portions 271 formed through the pixel area PA may be arranged in a V-shape. Alternatively, two of the first slit portions 271 different from each other are crossed at the center line C-C' and a portion of the first slit portion 271 extends in parallel with the center line C-C'. Two of the first slit portions 271 may be arranged in a Y-shape.

The edges 272 and 274 facing each other of the first slit portion 271 have a convex and concave pattern. For example, the edges 272 and 274 have a groove 273 and a protruding portion 275 formed in an alternating arrangement. The protruding portion 275 is defined by the two of grooves 273 that are adjacent to each other. Accordingly, the depth of the groove 273 is substantially identical to the height of the protruding portion 275. Also, a side surface of the protruding portion 275 is substantially identical to a side surface of the groove 273. The depth of the groove 273 and the height of the protruding portion are formed of a definite depth or height, for example, about 2 μm to 4 μm.

The depth and height represent a depth and a height in a width direction of the first slit portion 271 substantially perpendicular to the slanted direction Z.

In this embodiment, a side surface of the groove 273, that is, a side surface of the protruding portion 275 is substantially perpendicular to the slanted direction Z. That is, an edge of the protruding portion 275 is substantially perpendicular-edged.

The first edge 272 and second edge 274 face each other on the first slit portion 271. Accordingly, the groove 273 and the protruding portion 275 are formed in an alternating arrangement at the first edge 272 and the second edge 274, respectively.

A first groove 273 formed at the first edge 272 corresponds to the second protruding portion 275 formed at the second edge 274, a first protruding portion 275 formed at the first edge 272 corresponds to a second groove 273 formed at the second edge 274.

The length of the first and second grooves 273 in a slanted direction Z is longer than the length of the first and the second protruding portions 275 in a slanted direction Z. The first and the second protruding portions 275 are not interposed in the second and the first groove 273. Alternatively, the first and the second protruding portions 275 may be interposed in the second and the first groove 273.

The first and second groove 273, and the first and the second protruding portions 275 are disposed in an alternating arrangement with each other as described above, so that the first slit portion 271 has a zigzag pattern in the slanted direction Z when viewed as a whole. A side surface of the first groove 273 and a side surface of the second protruding portion 275 corresponding to the first groove 273 are facing each other. A side surface of the first groove 273 and a side surface of the second protruding portion 275 correspond to a position where the first slit portion 271 is bent. Hereinafter, the first slit portion 271 of the bent position is called a bent portion.

The first slit portions 271 divide the pixel area PA into a plurality of domains. A generating position of singular point SP is uniform by a bent portion of the first slit portions 271 on a liquid crystal layer 108 arrayed in the domains.

The singular point SP is defined as a singular point where an arrangement of liquid crystal is suddenly changed to directions different from that of a peripheral liquid crystal molecule 109 and does not have a specific direction. The singular point is known to be generated in a position where an electric field becomes stronger or weaker than the surrounding electric field.

A positive singular point is formed in a position where an electric field is stronger than the surrounding electric field. The positive singular point is generated where a liquid crystal director is gathered into a point. A negative singular point is formed in a position where an electric field is weaker than the surrounding electric field. The negative singular point represents where the liquid crystal is spread into a radial shape. In addition, the positive singular point and the negative singular point are alternately formed.

Liquid crystal may not be able to block light at a singular point, and a generating position of the singular point is non-uniform, which results in formation of afterimages and spots on a displayed image by a display panel 100. A display device according to the present invention controls a generating position of the singular point, so that the singular point may be regular in the pixel area PA, which may prevent generation of afterimages and spots.

Figure 4:
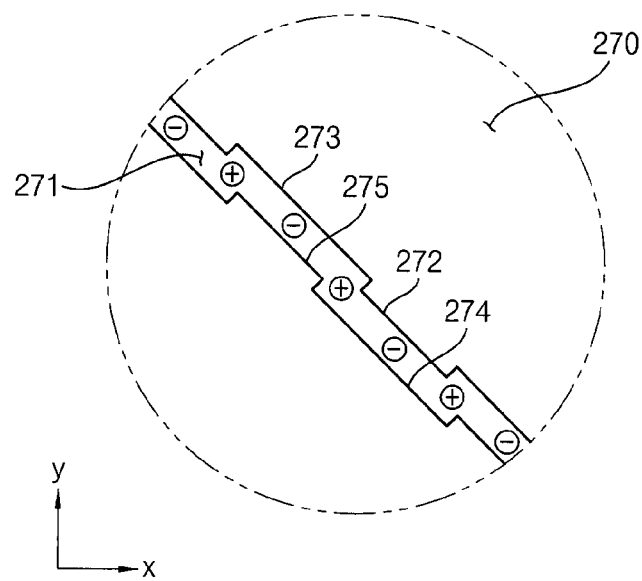
FIG. 4 is an enlarged view showing a first slit portion of FIG. 3.

FIG. 4 is an enlarged view showing a first slit portion 271 of FIG. 3.

Referring to FIG. 3 and FIG. 4, as a result of a simulation with regard to a display panel 100 according to an exemplary embodiment of the present invention, an electric field is enhanced more than the surrounding electric field to form a positive singular point on the bent portion of the first slit portions 271. Also, between the bent portions, that is, an electric field is weaker than the surrounding electric field to form a negative singular point on a position corresponding to the center of the groove 273 or the center of the protruding portion 275 in a slanted direction Z.

Accordingly, a generating position of a singular point of liquid crystal is definite on all of pixel area PA, so that afterimages and spots are not formed.

Alternatively, as described above, the first slit portion 271 substantially disposed of Y-shape is crossed at the center line C-C'. The crossing position is defined as a divergence point. A negative singular point is generally formed at the divergence point. Accordingly, a function of the divergence point is substantially identical to a position corresponding to a position between the bent portions with regard to controlling a singular point of liquid crystal.

To control a singular point of liquid crystal by the groove 273 and the protruding portion 275 effectively, the length of the groove 273 and the protruding portion 275 in a slanted direction Z may be properly controlled.

The length of the groove 273 and the protruding portion 275 in a slanted direction Z may about 60 µm to 90 µm. When the length is less than 60 µm or more than 90 µm, a generating position of a singular point of the liquid crystal may be non-uniform. Alternatively, the length of the groove 273 and the protruding portion 275 in a slanted direction Z may depend on the size of the pixel area PA.

Figure 5:
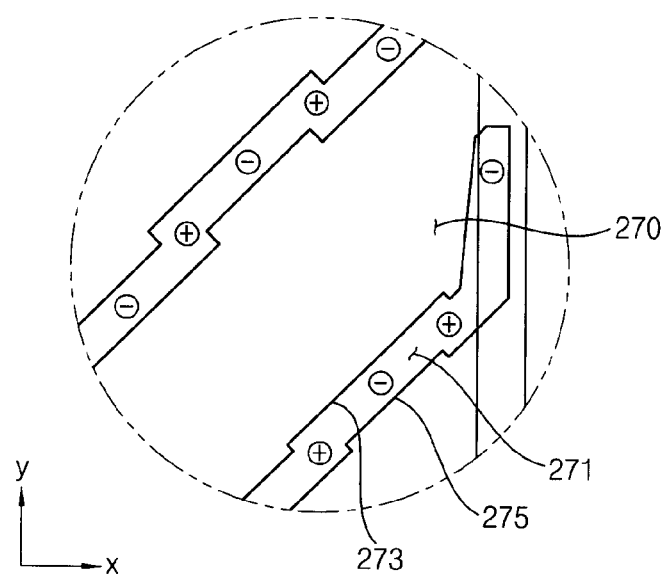
FIG. 5 is an enlarged view showing a bent portion of a first slit portion of FIG. 3.

FIG. 5 is an enlarged view illustrating a bent portion of a first slit portion 271 of FIG. 3.

Referring to FIG. 3 and FIG. 5, as described above, a bent portion of the first slit portion 271 is bent parallel with the horizontal side or the vertical side. A bent portion of the first slit portion 271 parallel with the vertical side is shown in FIG. 5.

As a result of the simulation, a negative singular point is generated at a bent portion of the first slit portion 271. Accordingly, a function of a bent portion of the first slit portion 271 is substantially identical to a position corresponding to a position between the bent portions with regard to inducing a singular point of liquid crystal.

Alternatively, the closest singular point from a bent portion of the first slit portion 271 is a positive (+) singular point. Accordingly, it is preferable that the bent portion is adjacent to the horizontal side or a vertical side having a bent portion of the first slit portion 271 disposed thereon. When the bent portion is far from a bent portion of the first slit portion 271, a forming portion of a singular point between a bent portion of the first slit portion 271 and the bent portion may be non-uniform.

Figure 6:
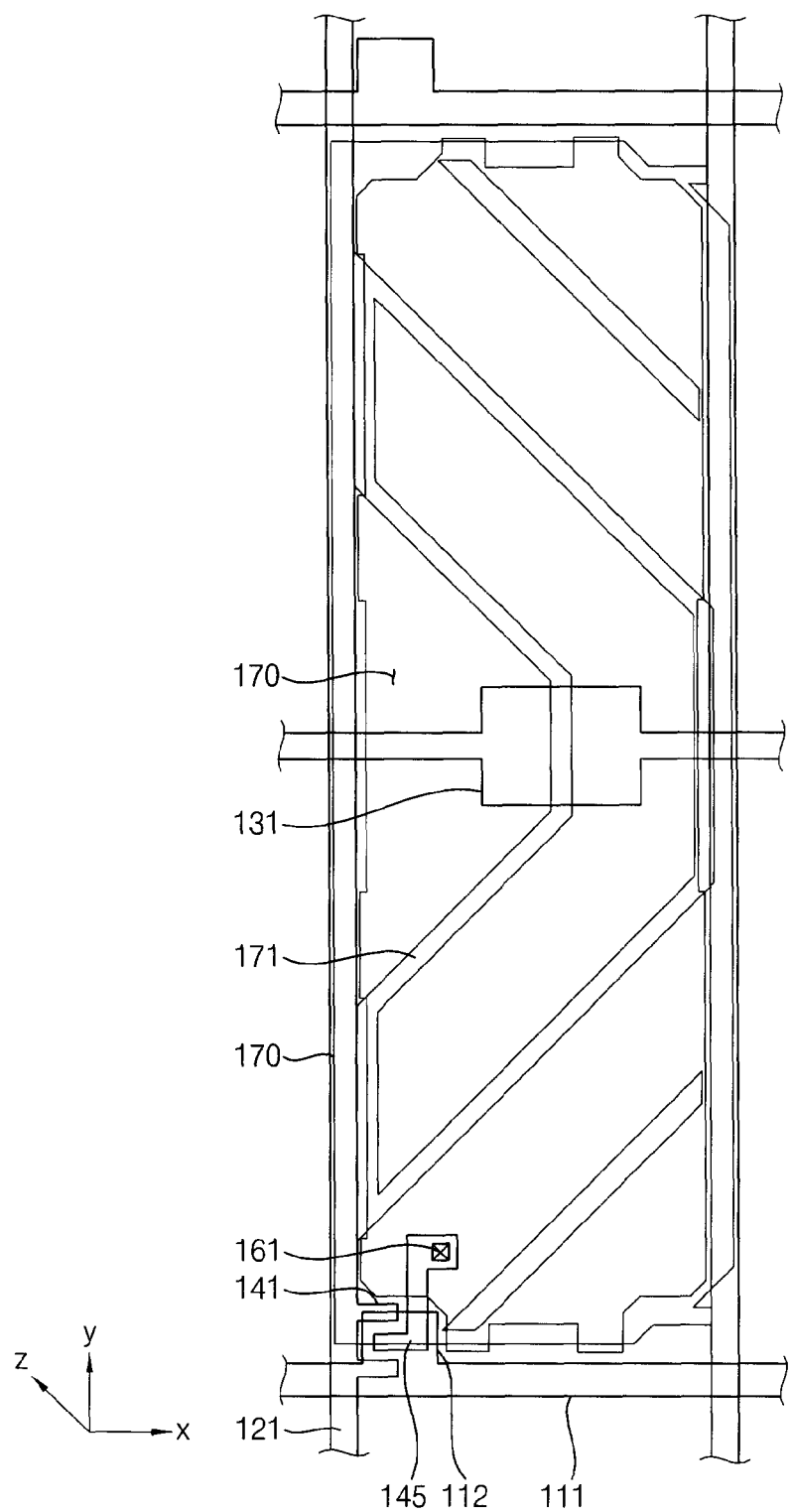
FIG. 6 is a plan view showing an array substrate of FIG. 2.

FIG. 6 is a plan view illustrating an array substrate 110 of FIG. 2

Referring to FIG. 1, FIG. 2, and FIG. 6, an array substrate 101 includes a lower substrate 103, a gate line 111 formed on the lower substrate 103, a data line 121, a maintenance electrode 131, a switching element 140, an insulation layer 160, and a pixel electrode 170.

The gate line 111 may apply a gate signal to the switching element 140 from an external signal source. The gate line 111 is formed on the lower substrate 103, and extends toward the horizontal side of the pixel area PA. A portion of each gate line 111 forms a plurality of gate electrodes 112. A contacting pad that applies the gate signal may be formed on a bent portion of the gate line 111. Alternatively, a bent portion of the gate line 111 may be directly connected to an output terminal of a gate driving circuit portion disposed on the lower substrate 103.

The maintenance electrode 131 is formed on the same layer of the lower substrate 103 as the gate line 111. The maintenance electrode 131 is disposed corresponding to the divergence point of the first slit portion 271 on the opposite substrate 105. Accordingly, the maintenance electrode 131 is disposed between adjacent gate lines 111.

A gate insulation layer 119 covers the gate line 111 and the maintenance electrode 131.

A plurality of the data lines 121 and a drain electrode 145 extended toward a vertical side are formed on the gate insulation layer 119. A bent portion of the drain electrode 145 corresponds to the center of the groove 273 or the protruding portion 275 formed on the first slit portion 271 in the slanted direction Z.

A source electrode 141 protrudes from the data line 121 toward the drain electrode 145. A lower portion of the data line 121 and the drain electrode 145 include a linear shape semiconductor layer 142 that generally extends in the vertical direction along the data line 121. The linearly shaped semiconductor layer 142 corresponds to the gate electrode 112, and has a channel layer overlapped with the source electrode 141 and the drain electrode 145.

The gate electrode 112, the gate insulation layer 119, the channel layer, the source electrode 141, the semiconductor layer 142, and the drain electrode 145 compose the switching element 140.

The insulation layer 160 covers the switching element 140 and the data line 121. A contact hole 161 is formed through the insulation layer 160 so that the contact hole exposes a portion of a bent portion of the drain electrode 145. Accordingly, the contact hole 161 may correspond to the center of the groove 273 or the protruding portion 275 formed on the first slit portion 271 in the slanted direction Z.

As a result of the simulation, it is recognized that a negative singular point is generated in a stepped groove formed in the insulation layer 160. Due to the contact hole 161, the insulation layer 160 is formed in a stepped shape.

Accordingly, when the contact hole 161 corresponds to the center of the groove 273 or the protruding portion 275 on the first slit portion 271 in the slanted direction Z between the first slit portion 271 and the groove 273, a negative singular point may be fixedly formed on the contact hole 161, so that a singular point may be formed at a predetermined position.

The pixel electrode 170 is formed on the insulation layer 160, and is connected to the drain electrode 145 through the contact hole 161. A second slit portion 171 is formed through the pixel electrode 170. The second slit portion 171 extends in a slanted direction Z, and is disposed between the first slit portions 271. As a result, the pixel area PA is divided into a plurality of domains as described above.

The second slit portions 171 may be disposed to be symmetrical with respect to the center line C-C' in the horizontal direction similar to the first slit portions 271.

A stepped groove corresponding to the maintenance electrode 131 may be formed in the insulation layer 160 to increase a maintenance capacity by reducing the distance between the maintenance electrode 131 and the pixel electrode 170.

As described above, the maintenance electrode 131 is disposed corresponding to the divergence point on the first slit portion 271. As described above, a negative singular point is generated by the stepped groove 165 formed in the insulation layer 160. Also, a negative singular point of liquid crystal is generated by the divergence point. Accordingly, a negative singular point may be definitely generated on the stepped groove or the divergence point, and as a result, a position of a positive singular point may be fixedly controlled.

The liquid crystal layer 108 is aligned in a vertical direction between the opposite substrate 105 and the array substrate 101. The liquid crystal layer 108 includes the liquid crystal 209. An arrangement angle of the liquid crystal 209 is changed by an electric field formed between the pixel electrode 170 and the common electrode 270.

The first slit portion 271 formed through the common electrode 270 and the second slit portion 171 formed through the pixel electrode 170 causes a distortion of the direction of an electric field to rearrange a director of the liquid crystal 209. Accordingly, the directors of the liquid crystal 209 are different from each other on a plurality of domains to improve a side viewing angle.

As described above, a singular point of the liquid crystal 209 is constantly generated on the bent portion of the first slit portion 271, between the bent portions, a bent portion of the first slit portion 271, and a divergence point of the first slit portion 271 in the pixel area PA. Accordingly, a difference by a non-uniform generation of a singular point between the pixels may not be recognized. Thus, the display quality of a display device may be improved due to the non-recognition of afterimages or spots.

A display substrate and a display panel 100 of the present invention may be employed in all types of vertical alignment (VA) liquid crystal display (LCD) panels 100. That is, when an electrode which controls the liquid crystal 209 is patterned and the liquid crystal 209 of an LCD panel is vertically aligned, it is employed in any cases that are not relevant to whether a position of the color filter 230 is on the opposite substrate 105 or the array substrate 101, and whether the insulation layer 160 is formed on the array substrate 101. Accordingly, it will be apparent that the modified examples are within the technological scope of the present invention.

Figure 7A:
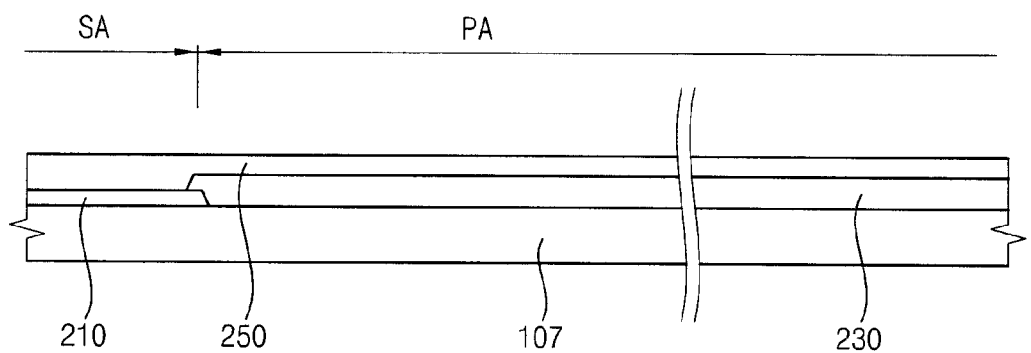
FIG. 7A, FIG. 7B, and FIG. 7C are cross-sectional views showing a process for manufacturing the opposite substrate of FIG. 2 and FIG. 3.
Figure 7B:
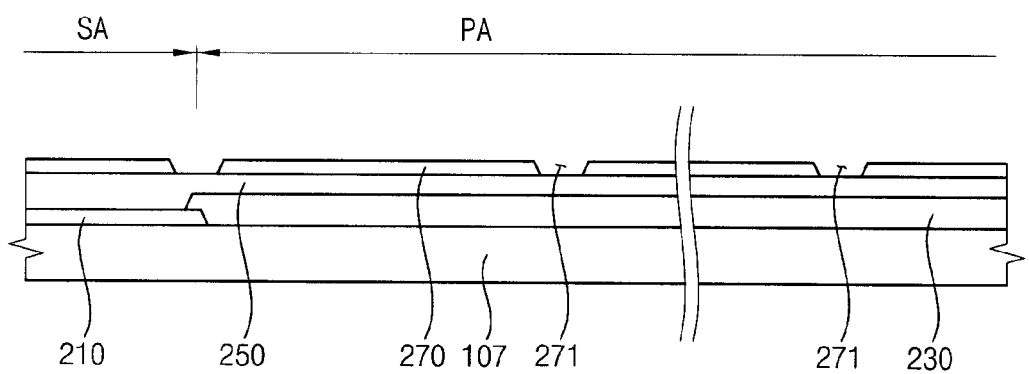
Figure 7C:
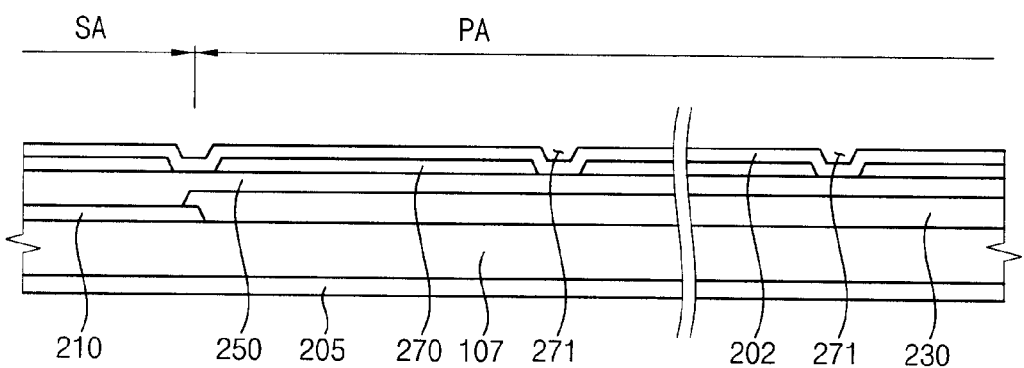

FIG. 7A, FIG. 7B, and FIG. 7C are cross-sectional views illustrating a process for manufacturing the opposite substrate of FIG. 2 and FIG. 3. A display panel manufactured by the processes shown in FIG. 7A, FIG. 7B, and FIG. 7C is substantially identical to the opposite substrate 105 described in FIG. 1, FIG. 2, FIG. 3, FIG. 4, FIG. 5, and FIG. 6. Accordingly, the same reference numerals will be used to refer to the same elements as those described.

To manufacture the display substrate 101, as well as the opposite substrate 105, as shown in FIG. 7A, a light-blocking material layer is deposited on the upper substrate 107, and is patterned to form the light-blocking pattern 210 on the light-blocking area SA.

Then, a color photoresist layer is deposited in the pixel area PA defined by the light-blocking pattern 210, and then the color photoresist layer is patterned to form the color filter 230. Then, a resin is formed to cover the color filter 230 and the light-blocking pattern 210 to form the overcoating layer 250.

Then, an optically transparent and electrically conductive material such as ITO or IZO is formed on the overcoating layer 250 to form a common electrode layer (not shown). Then, the common electrode layer is patterned to form the common electrode 270 having the first slit portions 271 formed therethrough, as shown in FIG. 7B.

Then, as shown in FIG. 7C, an upper alignment layer 202 covering the common electrode 270 is formed to complete the opposite substrate 105.

The opposite substrate 105 and the array substrate 101 are combined with each other, and then the liquid crystal layer 108 is interposed between the opposite substrate 105 and the array substrate 101 to manufacture the display panel 100.

A process of forming the array substrate 101 is substantially identical to a following explanation in the third exemplary embodiment. Thus, any detailed explanation concerning a process of forming the array substrate will be alternated to a following explanation.

Figure 8:
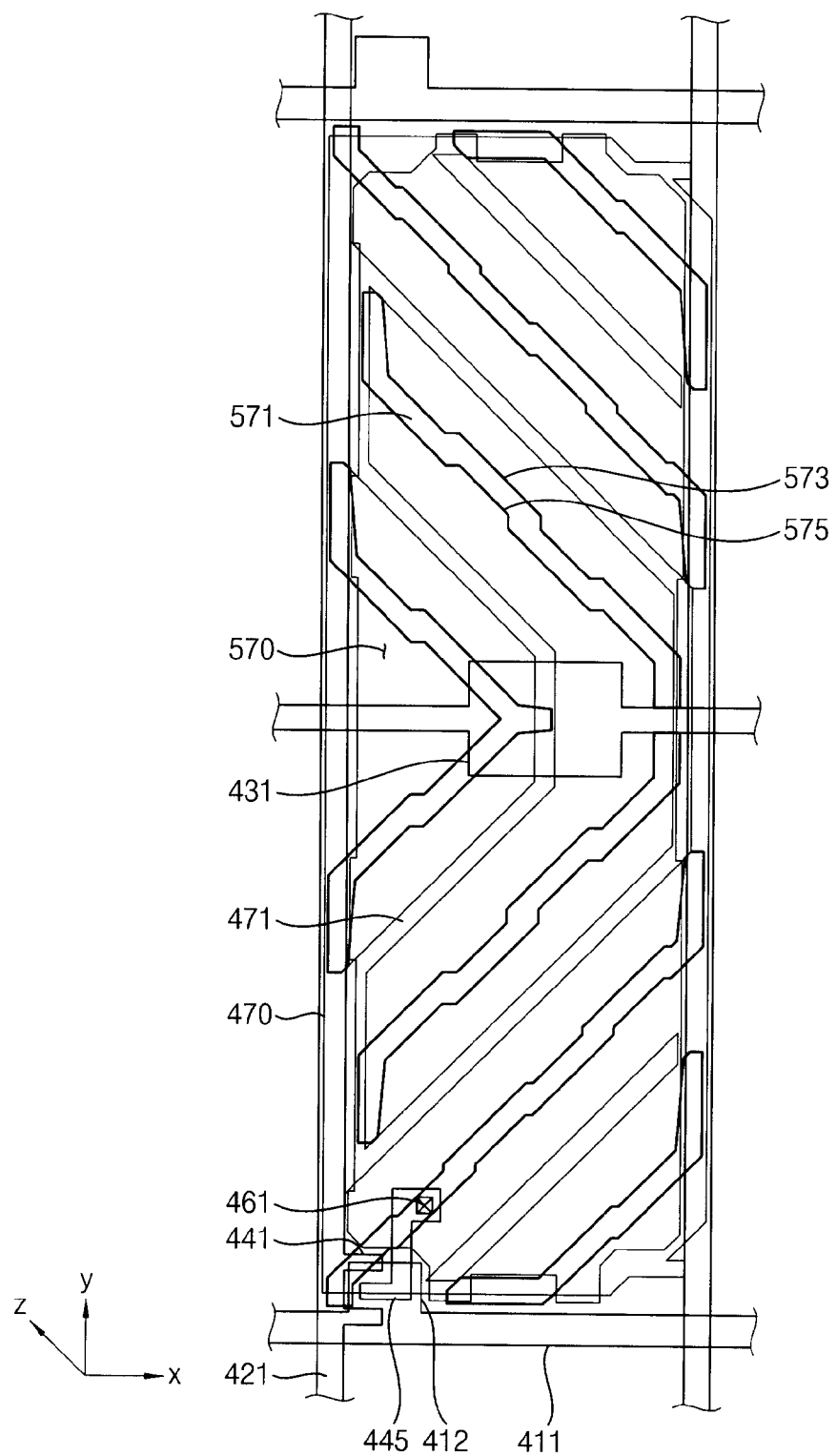
FIG. 8 is a plan view showing a display panel according to a second exemplary embodiment of the present invention.

FIG. 8 is a plan view illustrating a display panel according to a second exemplary embodiment of the present invention.

Referring to FIG. 8, a display panel 400 in this embodiment is substantially identical to the display panel 100 described in FIG. 1, FIG. 2, FIG. 3, FIG. 4, FIG. 5, FIG. 6, FIG. 7A, FIG. 7B, and FIG. 7C except that the shape of a groove 573 and a protruding portion 575 is altered, in which the groove 573 and the protruding portion 575 are formed through the first slit portion 571 on an opposite substrate. Thus, the same reference numerals will be used to refer to the same elements as those described, and any detailed explanation will be omitted.

A display substrate 500 in this embodiment, that is, the opposite substrate 501 is substantially identical to the opposite substrate described in FIG. 1, FIG. 2, FIG. 3, FIG. 4, FIG. 5, FIG. 6, FIG. 7A, FIG. 7B, and FIG. 7C except for the shape of a groove 573 and a protruding portion 575 formed through the first slit portion 571. Thus, the same reference numerals will be used to refer to the same elements as those described, and any detailed explanation will be omitted.

In this embodiment, the common electrode 570 on the opposite substrate has a first slit portion 571 formed therethrough, as described above, edges facing each other of the first slit portion 571 have a groove 573 and a protruding portion 575 formed in an alternating arrangement so that the protruding portion 575 is defined by adjacent grooves 573. The edges facing each other have the groove 573 and the protruding portion 575 formed facing each other in an alternating arrangement.

In this embodiment, a side surface of the groove 573, that is, a side surface of the protruding portion substantially forms an angle of about 45 degrees in the slanted direction Z extended from the first slit portion 571. That is, the protruding portion 575 may have a trapezoidal shape.

When this embodiment is compared with the first exemplary embodiment in which a side surface of the protruding portion 575 forms an angle of about 90 degrees in the slanted direction Z, it is recognized that the stability of generating a singular point of the liquid crystal in a predetermined position is similar to the first exemplary embodiment.

In this embodiment, a side surface of the groove 573 or the protruding portion 575 forms an angle of 45 degrees in the slanted direction Z and the length of the bent portion is slightly longer, so that a positive singular point of the liquid crystal may be easily formed.

A process of forming an opposite substrate in this embodiment is substantially identical to the process of forming an opposite substrate described in FIG. 7A, FIG. 7B, and FIG. 7C. Also, a process of forming a display panel 400 in this embodiment is substantially identical to the process described in the first exemplary embodiment. Accordingly, any detailed explanation will be omitted.

Figure 9:
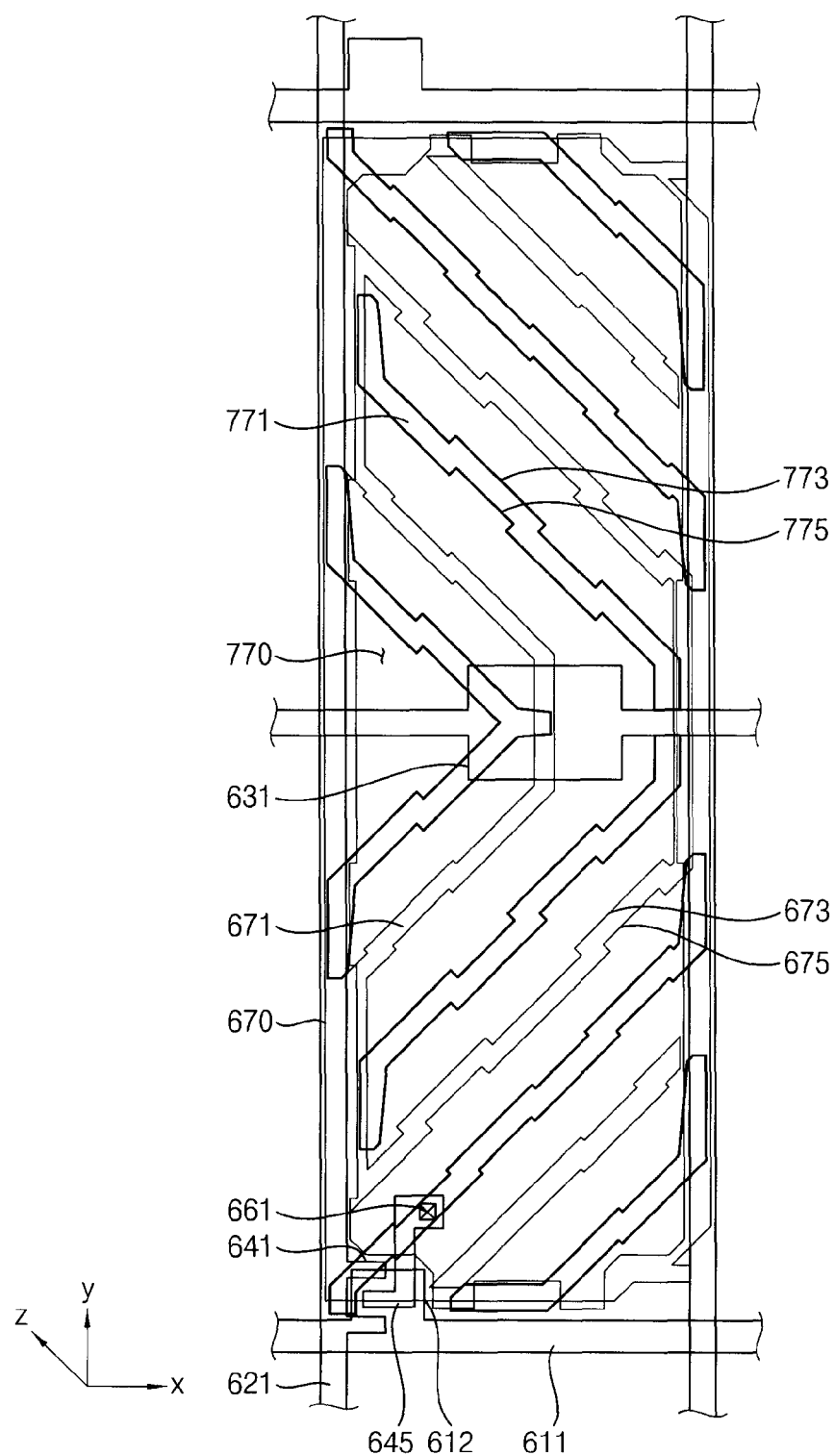
FIG. 9 is a plan view showing a display panel according to a third exemplary embodiment of the present invention.

FIG. 9 is a plan view illustrating a display panel 600 according to a third exemplary embodiment of the present invention.

Referring to FIG. 9, a display panel 600 in this embodiment is substantially identical to the display panel 100 described in FIG. 1, FIG. 2, FIG. 3, FIG. 4, FIG. 5, FIG. 6, FIG. 7A, FIG. 7B, and FIG. 7C except that a groove 673 and a protruding portion 675 are formed in an alternating arrangement through a second slit portion 671 formed through a pixel electrode 670 on an array substrate to have a convex and concave pattern. Accordingly, the same reference numerals will be used to refer to the same elements as those described, and any detailed explanation will be omitted.

A display substrate in this embodiment is substantially identical to an array substrate 101 described in FIG. 1, FIG. 2, FIG. 3, FIG. 4, FIG. 5, and FIG. 6 except that a groove 673 and a protruding portion 675 are formed in an alternating arrangement through the second slit portion 671 formed through the pixel electrode 670 to have a convex and concave pattern. Accordingly, the same reference numerals will be used to refer to the same elements as those described, and any detailed explanation will be omitted.

Also, a groove 673 and a protruding portion 675 formed in an alternating arrangement at edges facing each other of the second slit portion 671 formed through the pixel electrode 670 are substantially identical to a manner and the shape of a groove 773 and a protruding portion 775 of the first slit portion 771 formed through the common electrode 770. Accordingly, any detailed explanation will be omitted.

As shown in FIG. 9, a groove 773 formed through the first slit portion 771 and a protruding portion 675 formed through the second slit portion 671 may be adjacent to each other. Also, a protruding portion 775 formed through the first slit portion 771 and a groove 673 formed through the second slit portion 671 may be adjacent to each other.

Figure 10A:
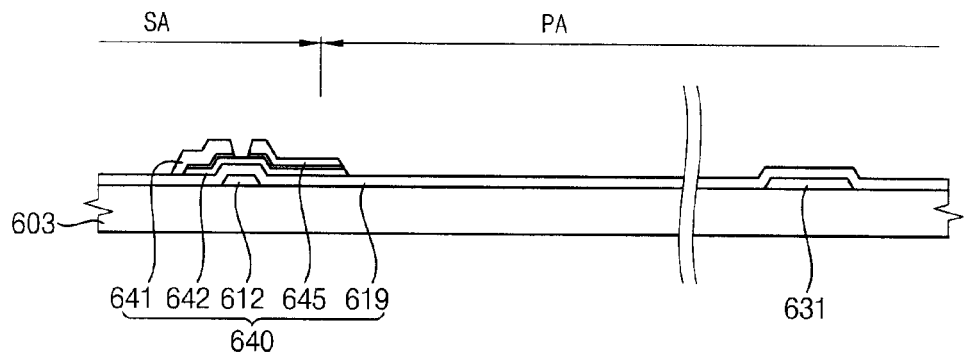
FIG. 10A, FIG. 10B, and FIG. 10C are cross-sectional views showing a process for manufacturing the array substrate of FIG. 9.
Figure 10B:
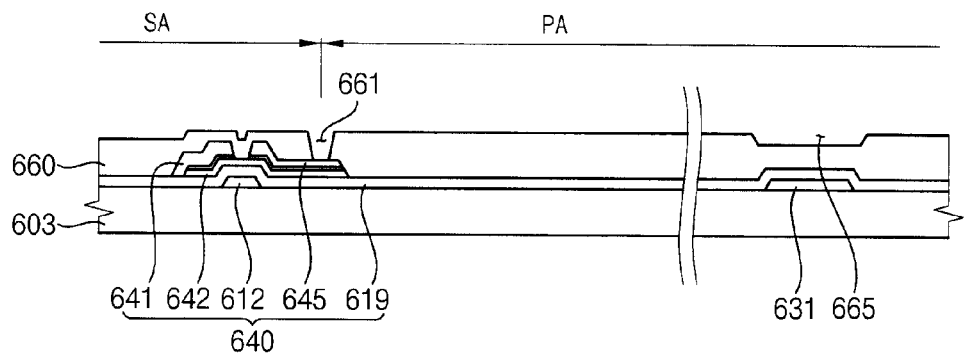
Figure 10C:
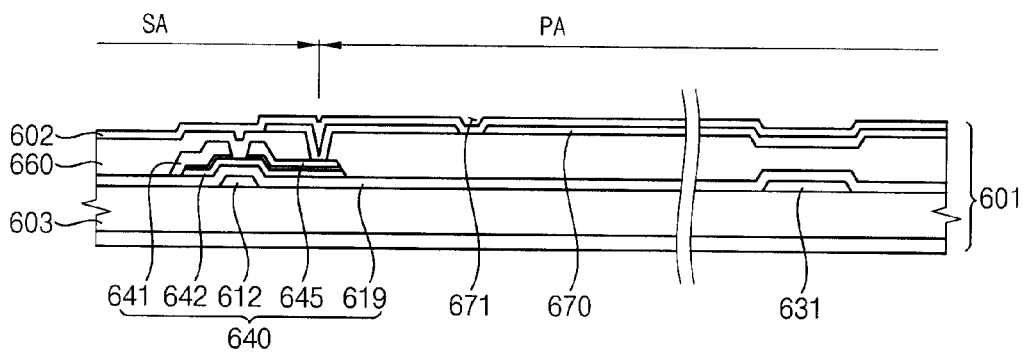

FIG. 10A, FIG. 10B, and FIG. 10C are cross-sectional views illustrating a process for manufacturing the array substrate 601 of FIG. 9.

A process of forming the opposite substrate in process of forming a display panel of the present exemplary embodiment is substantially identical to the process of forming an opposite substrate 105 described in FIG. 7A, FIG. 7B, and FIG. 7C. Accordingly, any detailed explanation will be omitted.

A process of forming the array substrate 601 in process of forming display panel of the present exemplary embodiment is identical to a process of forming a display substrate of the present exemplary embodiment, that is, a process of forming the array substrate 601.

To manufacture a display substrate in the present exemplary embodiment, that is, the array substrate 601, as shown in FIG. 10A, a gate metal layer is deposited via a sputtering process on the lower substrate 603, and is patterned by photolithography method to form the gate line 611, the gate electrode 612, and the maintenance electrode 631.

Then, a gate insulation layer 619 is formed on the lower substrate 603. A semiconductor layer and a source metal layer are deposited. Then, the semiconductor layer and the source metal layer are patterned to form the semiconductor pattern 642, the data line 621, the source electrode 641, and the drain electrode 645.

Then, as shown in FIG. 10B, an insulation layer of organic material is formed on the lower substrate 603 having the data line 621 formed thereon. The insulation layer is patterned to form an insulation layer 660 having the contact hole 661 that exposes the bent portion of the drain electrode 645 and the stepped groove 665 that is formed in a portion of the insulation layer 600 corresponding to the maintenance electrode 631.

Then, an optically transparent and electrically conductive material is deposited on the insulation layer 660 to form a pixel electrode layer. As shown in FIG. 10C, the pixel electrode layer is patterned to form the pixel electrode 670 having a second slit portion 671 formed therethrough.

Finally, a lower alignment layer 602 is formed on the lower substrate 603 having the pixel electrode 670 formed thereon to form the array substrate 601.

Then, the opposite substrate and the array substrate 601 manufactured by a process described in FIG. 7A, FIG. 7B, and FIG. 7C are combined. Liquid crystal is interposed between the opposite substrate and the array substrate to form the display panel 600.

Figure 11:
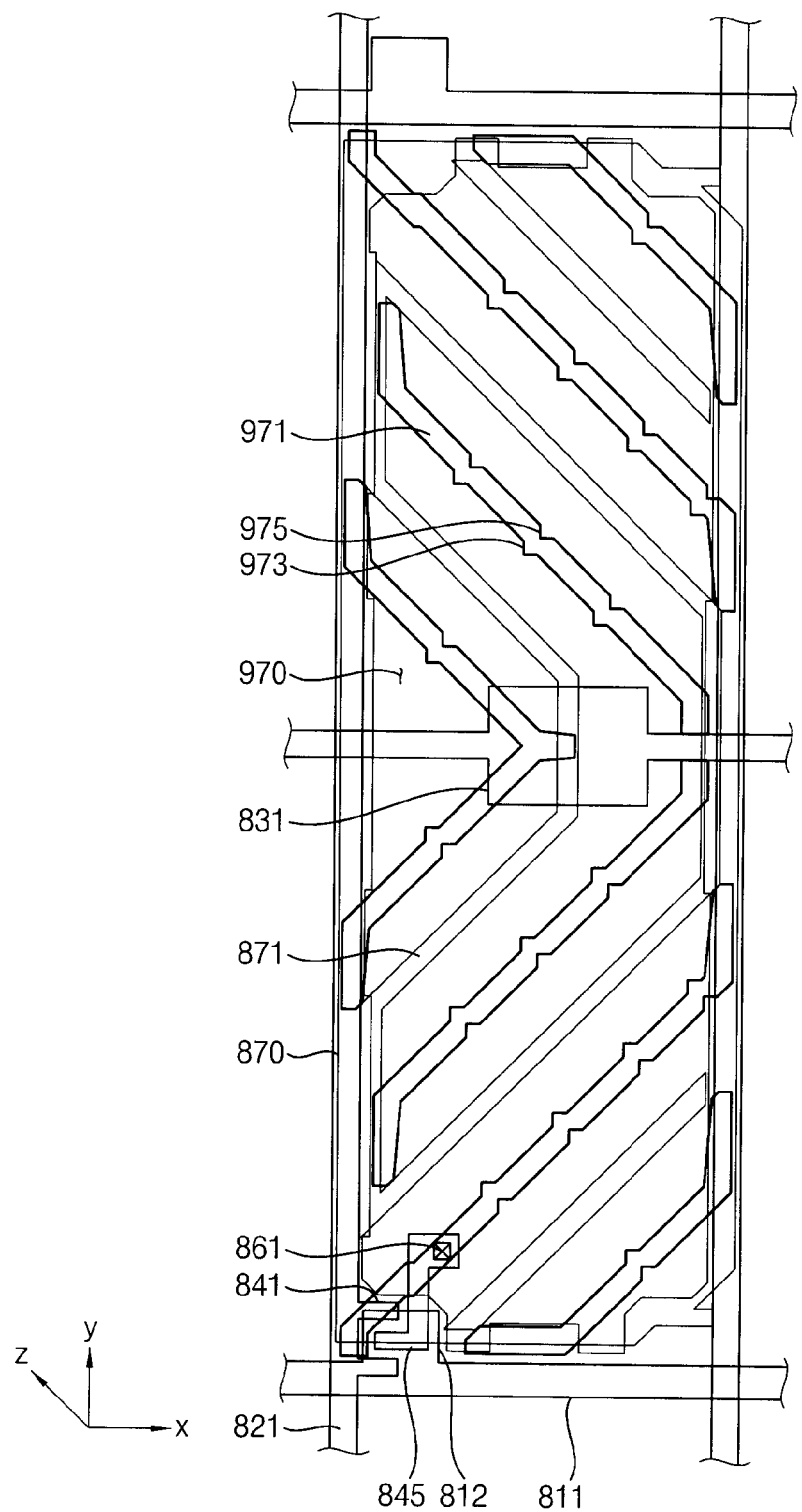
FIG. 11 is a plan view showing a display panel according to a fourth exemplary embodiment of the present invention.

FIG. 11 is a plan view illustrating a display panel 800 according to a fourth exemplary embodiment of the present invention.

Referring to FIG. 11, a display substrate in this embodiment, that is, an opposite substrate is substantially identical to the opposite substrate 105 described in FIGS. FIG. 1, FIG. 2, FIG. 3, FIG. 4, FIG. 5, FIG. 6, FIG. 7A, FIG. 7B, and FIG. 7C except for the shape of a groove 973 and a protruding portion 975 formed on the first slit portion 971. Thus, the same reference numerals will be used to refer to the same elements as those described, and any detailed explanation will be omitted.

In this embodiment, a common electrode 970 of the opposite substrate has a first slit portion 971 formed therethrough, and the edges of the first slit portion 971 face each other, as described above, and have a groove 973 and a protruding portion 975 corresponding to the groove 973 The groove 973 and the protruding portion 975 have a triangular shape. A plurality of the grooves 973 are formed through one of the edges, a plurality of the protruding portion 975 facing the groove 973 are formed on the other edge facing the edge. Alternatively, the groove 973 and the protruding portion 975 may be formed in an alternating arrangement on a first edge, the protruding portion 975 and the groove 973 may be formed in an alternating arrangement on a second edge pairing with the groove 973 and the protruding portion 975 on the first edge.

In this embodiment, side surfaces of the groove 973 and the protruding portion 975 substantially form an angle of about 45 degrees in the slanted direction Z extended from the first slit portion 971. That is, the groove 973 and the protruding portion 975 may have a right isosceles triangular shape.

When this embodiment is compared with the first exemplary embodiment in which a side surface of the protruding portion 275 forms an angle of about 90 degrees in the slanted direction Z, it is recognized that the stability of generating a singular point of the liquid crystal in a predetermined position is similar to the first exemplary embodiment.

A process of forming an opposite substrate in this embodiment is substantially identical to the process of forming an opposite substrate described in FIG. 7A, FIG. 7B, and FIG. 7C. Also, a process of forming a display panel 800 in this embodiment is substantially identical to the process described in the first exemplary embodiment. Accordingly, any detailed explanation will be omitted.

A display panel 800 in this embodiment is substantially identical to the display panel described in FIG. 1, FIG. 2, FIG. 3, FIG. 4, FIG. 5, FIG. 6, FIG. 7A, FIG. 7B, and FIG. 7C expect including the opposite substrate described in FIG. 11. Accordingly, the same reference numerals will be used to refer to the same elements as those described, and any detailed explanation will be omitted.

Figure 12:
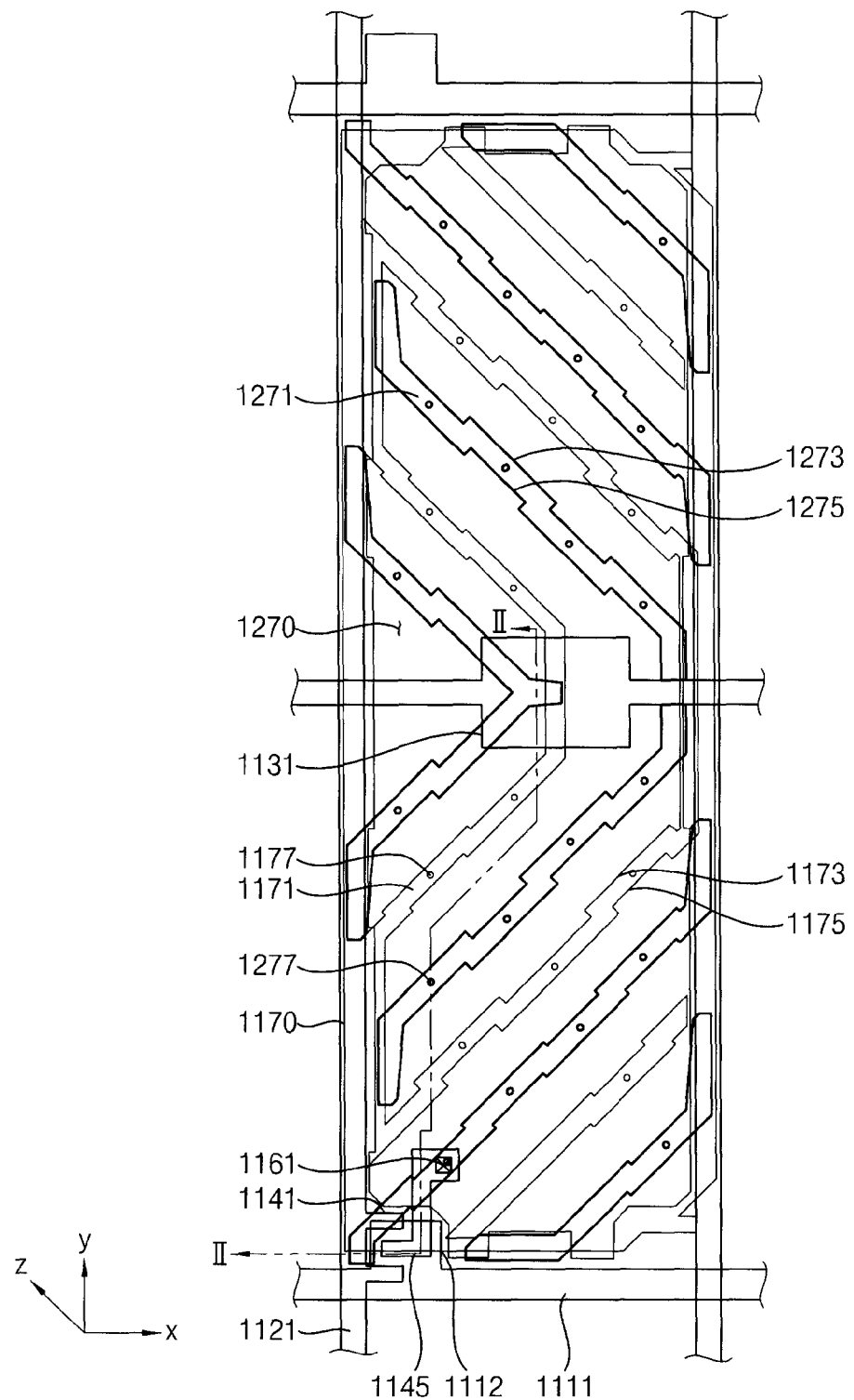
FIG. 12 is a plan view showing a display panel according to a fifth exemplary embodiment of the present invention.
Figure 13:
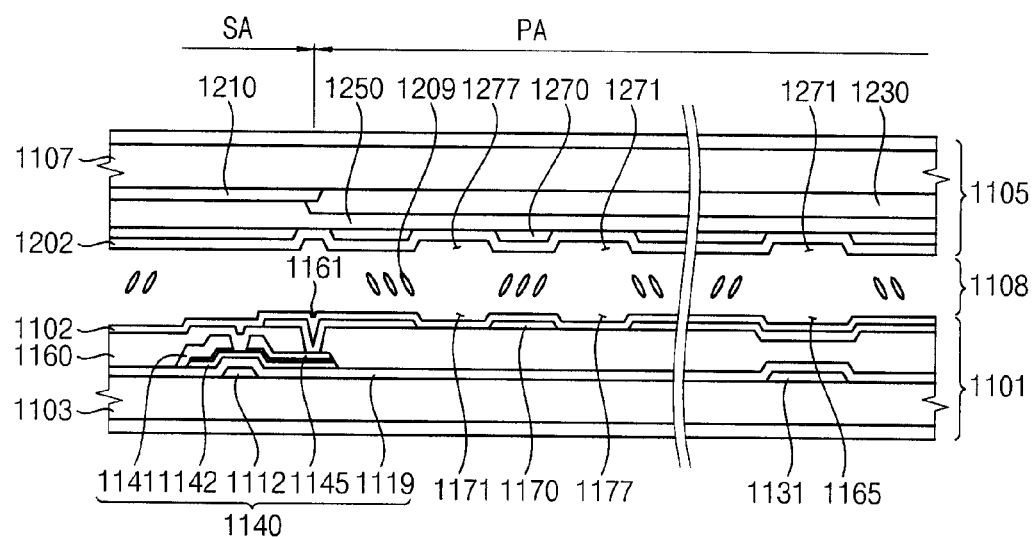
FIG. 13 is a cross-sectional view taken along line II-II' of FIG. 12.

FIG. 12 is a plan view illustrating a display panel 1100 according to a fifth exemplary embodiment of the present invention. FIG. 13 is a cross-sectional view taken along line II-II' of FIG. 12.

Referring to FIG. 12 and FIG. 13, a display panel 1100 of the present embodiment is substantially identical to the display panel 600 described in FIG. 9, FIG. 10A, FIG. 10B, and FIG. 10C except that a pixel electrode 1170 formed on array substrate 1101 further includes a first hole 1177, and a common electrode 1270 formed on opposite substrate 1105 further includes a second hole 1277. Accordingly, the same reference numerals will be used to refer to the same elements as those described, and any detailed explanation will be omitted.

In this embodiment, the pixel electrode 1170 further includes the first hole 1177 formed therethrough. The first hole 1177 is formed between the edges facing each other of the first slit portion 1271 formed through the common electrode 1270, and corresponds to the center of a groove 1273 or a protruding portion 1275 of the first slit portion 1271 in the slanted direction Z. The first hole 1177 has a size smaller than the width of the first slit portion 1271.

In this embodiment, the common electrode 1270 further has the second hole 1277 formed therethrough. The second hole 1277 is formed between the edges facing each other of the second slit portion 1171 formed through the pixel electrode 1170, and corresponds to the center of a groove 1173 or a protruding portion 1175 of the second slit portion 1171 in the slanted direction Z. The second hole 1277 has a smaller diameter than the width of the second slit portion 1171.

A process of forming an opposite substrate 1105 in this embodiment is substantially identical to the process of forming an opposite substrate described in FIG. 7A, FIG. 7B, and FIG. 7C except that the first slit portion 1271 is formed with the second hole 1277 on the common electrode 1270, and a process of forming a display panel 1100 in this embodiment is substantially identical to the process of forming an array substrate 601 described in FIG. 10A, FIG. 10B, and FIG. 10C except that the second slit portion 1170 is formed with the first hole 1177 on the pixel electrode 1170. Accordingly, any detailed explanation will be omitted.

In this embodiment, the upper alignment layer 1202 has a groove formed corresponding to the first hole 1177, and a negative singular point is generated by the groove on a liquid crystal layer 1108 of the first hole 1177. The lower alignment layer 1102 has a groove formed corresponding to the second hole 1277, and a negative singular point is generated by the groove on a liquid crystal layer 1108 of the second hole 1277. Accordingly, a positive singular point is formed on the bent portion of the first slit portion 1271 and the second slit portion 1171. A negative singular point is definitely formed by the first hole 1177 and the second hole 1277 between the bent portions. Thus, stability may be improved so that a singular point of the liquid crystal may be generated at a predetermined position.

Figure 14:
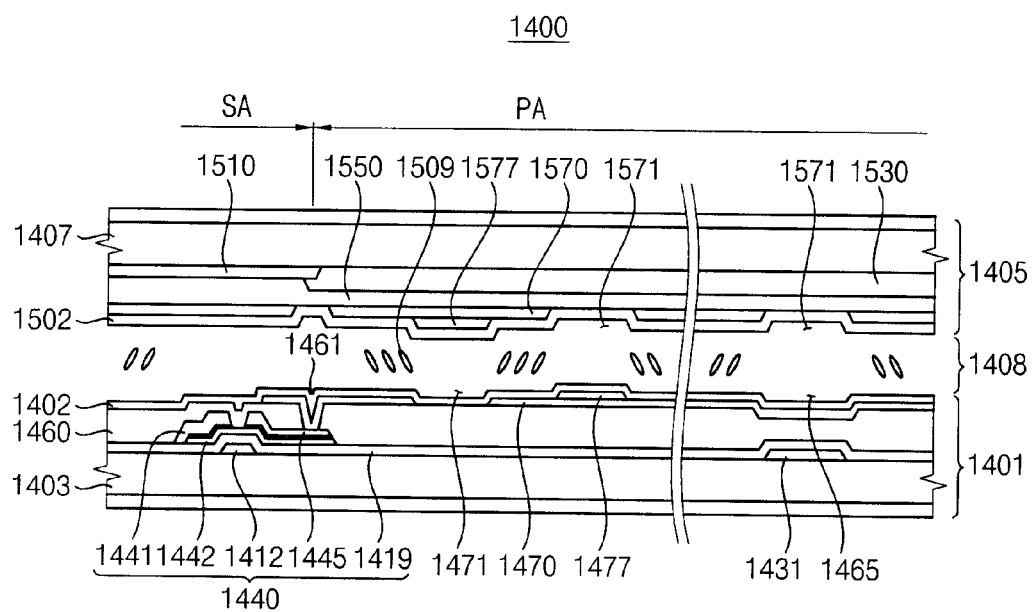
FIG. 14 is a cross-sectional view showing a display panel according to a sixth exemplary embodiment of the present invention.

FIG. 14 is a cross-sectional view showing a display panel 1400 according to a sixth exemplary embodiment of the present invention.

Referring to FIG. 14, a display panel 1400 of this exemplary embodiment is substantially identical to the display panel 600 described in FIG. 9, FIG. 10A, FIG. 10B, and FIG. 10C except that a first protrusion 1477, instead of a first hole, is formed on the pixel electrode 1470 of array substrate 1401 and a second protrusion 1577, instead of a second hole, is formed on a common electrode 1570 of an opposite substrate 1405. Accordingly, the same reference numerals will be used to refer to the same elements as those described, and any detailed explanation will be omitted.

In this embodiment, the first protrusion 1477 is formed on the pixel electrode 1470. The first protrusion 1477 is formed between the edges facing each other of the first slit portion 1571 formed through the common electrode 1570, and corresponds to the center of a groove or a protruding portion of the first slit portion 1571 in the slanted direction Z. The first protrusion 1477 has a size smaller than the width of the first slit portion 1571.

In this embodiment, the second protrusion 1577 is formed on the common electrode 1570. The second protrusion 1577 is formed between the edges facing each other of the second slit portion 1471 formed through the pixel electrode 1470, and corresponds to the center of a groove or a protruding portion of the second slit portion 1471 in the slanted direction Z. The second protrusion 1577 has a diameter smaller than the width of the second slit portion 1471.

In a process of forming an opposite substrate 1405 and a process of forming a display panel 1400 of the present invention, a transparent conductive layer such as ITO or IZO is patterned by photolithography to form the first slit portion 1571 on the common electrode 1570, and to form the second slit portion 1471 on the pixel electrode 1470. For example, a portion of a photoresist layer etched to form the first slit portion 1571 and the second slit portion 1471 remains to form the first protrusion 1477 and the second protrusion 1577. Thus, a process of forming the first protrusion 1477 and the second protrusion 1577 is not supplemented. A process of forming a display panel 1400 in the embodiment is substantially identical to the process of forming an opposite substrate 105 described in FIG. 7A, FIG. 7B, and FIG. 7C and an array substrate 601 described in FIG. 10A, FIG. 10B, and FIG. 10C except for forming the first protrusion 1477 and the second protrusion 1577. Accordingly, any detailed explanation will be omitted.

In this embodiment, it is recognized that a negative singular point is generated by the first protrusion 1477 and the second protrusion 1577 on a liquid crystal layer. Thus, a positive point is formed on bent portions of the first slit portion 1571 and the second slit portion 1471. A negative singular point is definitely formed by the first protrusion 1477 and the second protrusion 1577 between the bent portions. Thus, stability may be improved so that a singular point of the liquid crystal may be generated at a predetermined position.

Figure 15:
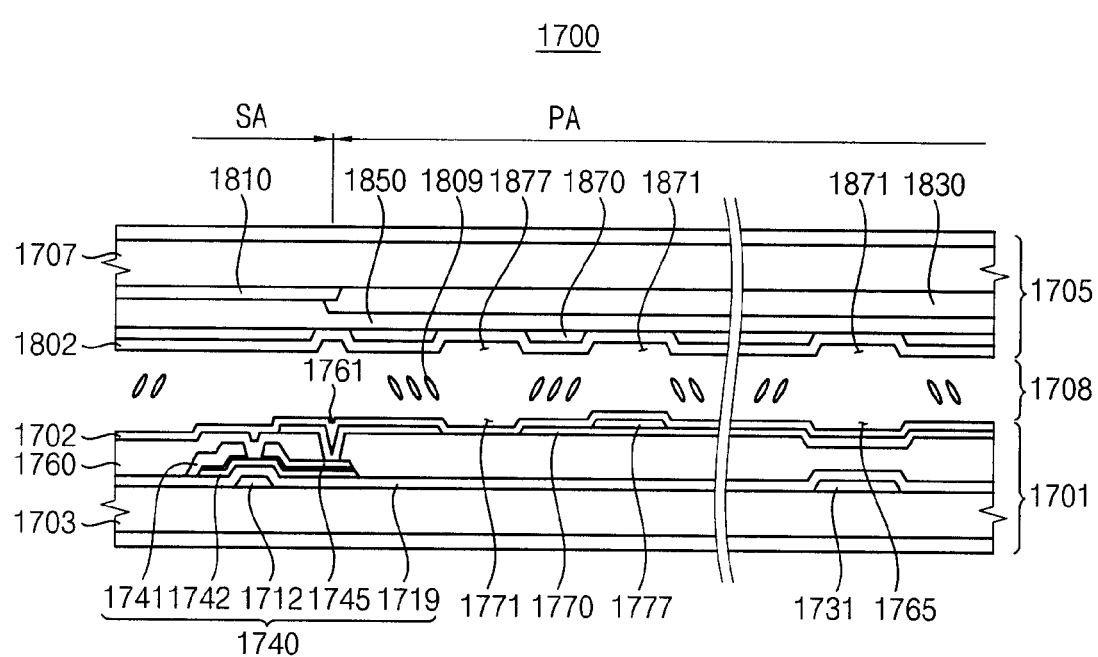
FIG. 15 is a cross-sectional view showing a display panel according to a seventh exemplary embodiment of the present invention.

FIG. 15 is a cross-sectional view showing a display panel 1700 according to a seventh exemplary embodiment of the present invention.

Referring to FIG. 15, a display panel 1700 and a process of forming the same in this embodiment is substantially identical to the display panel 1400 and a process of forming the same described in FIG. 14 except that a second hole 1877, instead of a second protrusion, is formed in the common electrode 1870 of the opposite electrode 1705. Accordingly, the same reference numerals will be used to refer to the same elements as those described, and any detailed explanation will be omitted.

In this embodiment, a first protrusion 1777 is formed on the array substrate 1701, and the second hole 1877 is formed on the opposite substrate 1705. Alternatively, a first hole may be formed on the array substrate 1701, and a second protrusion may be formed on the opposite substrate 1705. In addition, the first hole and the protrusion may be formed on the pixel electrode 1770 in an alternating arrangement or the second hole and the second protrusion may be formed on the common electrode 1870 in an alternating arrangement.

In this embodiment, a positive singular point is formed on bent portions of a first slit portion 1871 and a second slit portion 1771, the first protrusion 1777 is formed on the pixel electrode 1770 between the bent portions, and the second hole 1877 is formed through the common electrode 1870. Accordingly, a negative singular point is definitely formed. Thus, stability may be improved so that a singular point of the liquid crystal may be generated at a predetermined position.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display substrate comprising:
 a base substrate having a pixel area with a horizontal side and a vertical side; and a transparent electrode disposed in the pixel area and comprising a plurality of slit portions extending in a slanted direction with respect to the horizontal side and the vertical side, wherein a first edge of the slit portions comprises a first bent portion bent in a direction different from the slanted direction, and wherein a second edge of the slit portions faces the first edge and comprises a second bent portion corresponding to the first bent portion, and an interval distance across each of the slit portions between the first and second bent portions of the first and second edges corresponding to each other is the same as a width of each of the slit portions.

2. The display substrate of claim 1, wherein the first bent portion is substantially parallel with the second bent portion.

3. The display substrate of claim 1, wherein the first edge of the slit portions comprises a first groove and a first protruding portion that are alternately arranged, and the first bent portion is formed at a corner of the first groove or the first protruding portion, and wherein the second edge of the slit portions comprises a second groove corresponding to the first protruding portion and a second protruding portion corresponding to the first groove, and the second bent portion is formed at a corner of the second protruding portion or the second groove.

4. The display substrate of claim 1, wherein adjacent first bent portions of the first edge of the slit portion form a first protruding portion, and adjacent second bent portions of the second edge of the slit portion form a second groove corresponding to the first protruding portion.

5. The display substrate of claim 4, wherein adjacent first bent portions of the first edge of the slit portion form a first groove, and adjacent second bent portions of the second edge of the slit portion form a second protruding portion corresponding to the first groove.

6. The display substrate of claim 1, wherein the first and second bent portions are respectively arranged to have a depth and a height.

7. The display substrate of claim 1, wherein an angle of each of the first and second bent portions with respect to the slanted direction is at least one of 45 degrees or 90 degrees, and the first and second bent portions have at least one of a rectangular shape, a trapezoidal shape, and a triangular shape.

8. The display substrate of claim 1, wherein an orientation of the first bent portion and the second bent portion is in the same direction.

9. A display substrate comprising:

a base substrate having a pixel area with a horizontal side and a vertical side; and a transparent electrode disposed in the pixel area and comprising a plurality of slit portions extending in a slanted direction with respect to the horizontal side and the vertical side, wherein each of the slit portions comprises a bent portion bent in a direction different from the slanted direction, and wherein an interval distance across each of the slit portions between edges of the bent portions corresponding to each other is the same as a width of each of the slit portions.

10. The display substrate of claim 9, wherein the edges of the bent portion are substantially parallel with each other.

11. The display substrate of claim 9, wherein edges of adjacent bent portions of the slit portion form a first protruding portion and a second groove corresponding to the first protruding portion.

12. The display substrate of claim 9, wherein edges of adjacent bent portions of the slit portion form a first groove and a second protruding portion corresponding to the first groove.

13. The display substrate of claim 9, wherein the first and second bent portions are respectively arranged to have a depth and a height.

14. The display substrate of claim 9, wherein an angle of each of the first and second bent portions is at least one of 45 degrees or 90 degrees, and the first and second bent portions have at least one of a rectangular shape, a trapezoidal shape, and a triangular shape.

15. The display substrate of claim 9, wherein an orientation of the bent portions corresponding to each other is in the same direction.

16. A display panel comprising:

an array substrate comprising a lower substrate, a switching element arranged on the lower substrate, a signal line connected to the switching element, and a pixel electrode connected to an output electrode of the switching element;

an opposite substrate comprising:

an upper substrate having a pixel area with a horizontal side and a vertical side; and a common electrode comprising a plurality of slit portions extending in a slanted direction with respect to the horizontal side and the vertical side, wherein a first edge of the slit portions comprises a first bent portion bent in a direction different from the slanted direction, and wherein a second edge of the slit portions faces the first edge and comprises a second bent portion corresponding to the first bent portion, and an interval distance across each of the slit portions between the first and second bent portions of the first and second edges corresponding to each other is the same as a width of each of the slit portions; and a liquid crystal layer being arranged between the array substrate and the opposite substrate, to be vertically aligned with respect to the array substrate and the opposite substrate.

17. The display panel of claim 16, wherein the first bent portion is substantially parallel with the second bent portion.

18. The display panel of claim 16, wherein the first edge of the slit portions comprises a first groove and a first protruding portion that are alternately arranged, and the first bent portion is formed at a corner of the first groove or the first protruding portion, and wherein the second edge of the slit portions comprises a second groove corresponding to the first protruding portion and a second protruding portion corresponding to the first groove, and the second bent portion is formed at a corner of the second protruding portion or the second groove.

19. The display panel of claim 16, wherein adjacent first bent portions of the first edge of the slit portion form a first protruding portion, and adjacent second bent portions of the second edge of the slit portion form a second groove corresponding to the first protruding portion, and wherein adjacent first bent portions of the first edge of the slit portion form a first groove, and adjacent second bent portions of the second edge of the slit portion form a second protruding portion corresponding to the first groove.

20. The display substrate of claim 16, wherein an orientation of the first bent portion and the second bent portion is in the same direction.

21. A display panel comprising:
an array substrate comprising a lower substrate, a switching element arranged on the lower substrate, a signal line connected to the switching element, and a pixel electrode connected to an output electrode of the switching element;
an opposite substrate comprising:
an upper substrate having a pixel area with a horizontal side and a vertical side; and
a common electrode comprising a plurality of slit portions extending in a slanted direction with respect to the horizontal side and the vertical side, wherein each of the slit portions comprises a bent portion bent in a direction different from the slanted direction, and wherein an interval distance across each of the slit portions between edges of the bent portions corresponding to each other is the same as a width of each of the slit portions; and
a liquid crystal layer being arranged between the array substrate and the opposite substrate, to be vertically aligned with respect to the array substrate and the opposite substrate.

22. The display panel of claim 21, wherein the edges of the bent portion are substantially parallel with each other.

23. The display panel of claim 21, wherein edges of adjacent bent portions of the slit portion form a first protruding portion and a second groove corresponding to the first protruding portion, and
wherein edges of another adjacent bent portions of the slit portion form a first groove and a second protruding portion corresponding to the first groove.

24. The display substrate of claim 21, wherein an orientation of the bent portions corresponding to each other is in the same direction.

* * * * *